United States Patent [19]

Faraon-Chaul

[11] Patent Number: 5,022,438
[45] Date of Patent: Jun. 11, 1991

[54] FLUIDS RATE OF FLOW SAVING OR LIMITING DEVICE

[76] Inventor: Cesar Faraon-Chaul, Av. Industriales No. 20 Zona Industrial, Cuautitlán Izcalli, Mexico

[21] Appl. No.: 570,197

[22] Filed: Aug. 20, 1990

[51] Int. Cl.$^5$ .............................................. G05D 7/01
[52] U.S. Cl. ........................................ 138/42; 137/504
[58] Field of Search ................ 137/504, 517; 138/42, 138/44, 45

[56] References Cited

U.S. PATENT DOCUMENTS

| | | | |
|---|---|---|---|
| 780,986 | 1/1905 | Francis | 137/504 |
| 3,503,417 | 3/1970 | Toda | 137/504 X |
| 3,805,824 | 4/1974 | Robbins | 137/504 X |
| 4,075,294 | 2/1978 | Saito | 137/504 X |
| 4,650,094 | 3/1987 | Werding | 137/504 X |
| 4,962,792 | 10/1990 | Chaul | 138/42 |

FOREIGN PATENT DOCUMENTS 240955  1/1960  Australia .............................. 137/504

Primary Examiner—Robert G. Nilson
Attorney, Agent, or Firm—Sughrue, Mion, Zinn, Macpeak and Seas

[57] ABSTRACT

The dislodgement of the soft washer of a fluids rate of flow saving or limiting device comprising a fluid pressure actuated needle type shutter and a flow restricting washer assembly through which said shutter passes to obstruct the free flow of the fluid depending on the pressure thereof and inlcuding a soft washer sandwiched between two hard washers is prevented by enclosing said soft washer within a housing having a circular bottom provided with an opening of a predetermined diameter larger than the diameter of said shutter, a cylindrical wall extending upwardly along the periphery of said bottom to a distance sufficient to constitute a cavity for receiving said soft washer, and a lid to cover the housing and having an opening of the same diameter as said bottom, said lid being arranged with respect to said cylindrical wall so as to sandwich said soft washer between said lid and said bottom, said soft washer having an opening of a diameter smaller than the diameter of the openings in said lid and said bottom and being fixed within said housing to avoid dislodgement thereof by high fluid pressures.

5 Claims, 2 Drawing Sheets

FLUIDS RATE OF FLOW SAVING OR LIMITING DEVICE

FIELD OF THE INVENTION

This invention refers to needle type fluid saving devices and is more particularly related to improvements in a device for saving fluids by limiting the rate of flow thereof, by means of a needle type shutter which is not easily clogged and is of quiet operation, and still more particularly it refers to such a fluid saving device capable of uninterrupted and safe operation at high fluid pressures.

BACKGROUND OF THE INVENTION

Devices for saving or limiting the rate of flow of fluids such as water are well known in the art. Said devices are widely used to restrict fluid flow in showers, faucets, lavatories, toilets, etc. and particularly comprise a connecting tube which is provided with an inlet portion having internal threads and with an outlet portion having external threads, the portion corresponding to the external threads being of a smaller diameter than the remainder of the body of the connecting tube, said connecting tube being provided with a helical spring of a shape and a strength suitable to allow the desired rate of flow and arranged within said tube, and a specially designed needle-type shutter, particularly of a stepped cylindrical shape, concentrically arranged within said spring such that at the inlet end of the shutter, there is formed a flange, on the internal part of which bears the spring surrounding the needle type shutter, said spring bearing at its lower portion on an internal shoulder formed in the connecting tube.

The above mentioned flange arranged on the upper end of the needle type shutter, is provided with one or a plurality of axially extending holes for permitting the fluid to flow therethrough. During the operation of the prior art fluid rate of flow limiting devices, the vibration of the shutter due to passage of the fluid, produces a rattling effect of the body ends of the needle type shutter against the internal wall of the connecting tube and produces a noise level which may be regarded as being of a high degree of annoyance. On the other hand, the holes provided for the passage of the fluid, are rapidly clogged and even completely obstructed in a relatively short period of time, particularly when the fluid is impure or hot water. The above defects cause significant inconveniences because of the annoying noise of said prior art devices and because of the cumbersome and costly operation of frequently disassembling said connecting tube in order to clean the fluid flow holes of the shutter.

U.S. patent application Ser. No. 07/360,815 filed on June 2, 1989 by the same applicant hereof, now U.S. Pat. No. 4,962,792 describes and illustrates a device for restricting the flow rate of fluids, which represents a considerable advance over the prior art existing devices, inasmuch as by very simple means, said device eliminates the noise and the rattling effect produced by the vibration of the needle-type shutter of the prior art. The device of U.S. Ser. No. 07/360,815, now U.S. Pat. No. 4,962,792 comprises a needle-type shutter slidably movable within a tubular fitting towards and away from a flow restricting assembly comprising an annular soft washer sandwiched between a pair of hard washers, said soft washer having an opening of a diameter smaller than said hard washers, within which a reduced diameter stem portion is received when the fluid pressure biases the shutter towards said flow restricting assembly. The shutter has a larger diameter piston section provided with a top flange which is the part driven by the flow of the fluid. A helical spring is provided around said shutter, one end of said spring bearing on said flange, and the other end of said spring bearing on one of said hard washers. An O-ring is arranged between said flange of the shutter and the spring. Said O-ring prevents the production of noise caused by vibration of the shutter and said soft washer prevents the rattling effect at the stem portion of the shutter when the device is partially closed, and full closure is prevented by a plurality of projections provided on a shoulder formed in said shutter between the larger diameter and reduced diameter portions thereof, which projections abut against one of said hard washers forming passages for the fluid when the device is fully biased by the fluid pressure. Although this device practically solves all the problems of noise production and rattling of the prior art devices, it nevertheless still shows the drawback that derives from the fact that, at high pressures of fluid, the soft washer tends to be squeezed out of the sandwiched washer assembly, thus clogging the outlet of the tubular fitting with the consequent disabling of the whole device.

OBJECTS OF THE INVENTION

Having in mind the defects of the prior art flow rate saving or limiting devices, it is an object of the present invention to provide a fluid rate of flow saving or limiting device which will be of a very simple structure and yet will minimize the generation of noise and rattling due to vibration.

One other object of the present invention is to provide a fluid rate of flow saving or limiting device, of the above described character, which will prevent clogging of the fluid passages by impurities carried by said fluid.

Still another and more specific object of the present invention is to provide a fluid rate of flow saving or limiting device, of the above character, which will effectively prevent dislodging of the flow restricting parts thereof when subjected to high fluid pressures.

The foregoing objects and others ancillary thereto are preferably accomplished as follows:

According to a preferred embodiment of the present invention, a fluid rate of flow saving or limiting device comprises a tubular fitting having a fluid inlet at one end thereof and a fluid outlet at the other end thereof, a needle-type shutter slidably movable within said tubular fitting between an open and a closed position, said shutter comprising a cylindrical body the inlet section of which is of a larger diameter than the outlet section thereof, thus forming a shoulder between said inlet and outlet sections, a flange arranged at the end of the inlet section of said shutter to act as a piston which is pushed by the fluid entering said tubular fitting, a helical spring concentrically arranged around said shutter, one end of said spring bearing on said flange and the other end bearing on the free surface of a flow regulating washer assembly arranged at the outlet end of said tubular fitting for biasing said shutter towards the open position, a plurality of projections extending perpendicularly from the surface of said shoulder of the shutter for providing fluid passages when the shutter is forced by the fluid pressure towards the outlet end of said tubular fitting, by abutting against said washer assembly, and an O-ring arranged between said spring and said flange of the shutter to avoid direct contact therebetween, said flow regulating washer assembly comprising a washer of soft or plastics material having an opening at its center to permit entrance of the outlet section of said shutter therethrough, and a housing for said soft washer having a cylindrical wall, a top and a bottom each provided with a central opening of a diameter somewhat larger than that of the opening of said soft washer, said housing being non compressible to maintain a constant volume room for housing said soft washer firmly pressed and fixed between said top and said bottom and within said cylindrical wall of said housing, thus preventing the squeezing of said soft washer out of said housing and dislodging thereof under high fluid pressures.

BRIEF DESCRIPTION OF THE DRAWINGS

The novel features that are considered characteristic of the present invention, are set forth with particularity in the appended claims. The invention itself, however, both as to its organization and its method of operation, together with additional objects and advantages thereof, will best be understood from the following description of specific embodiments, when read in connection with the accompanying drawings, in which:

DETAILED DESCRIPTION

Figure 1:
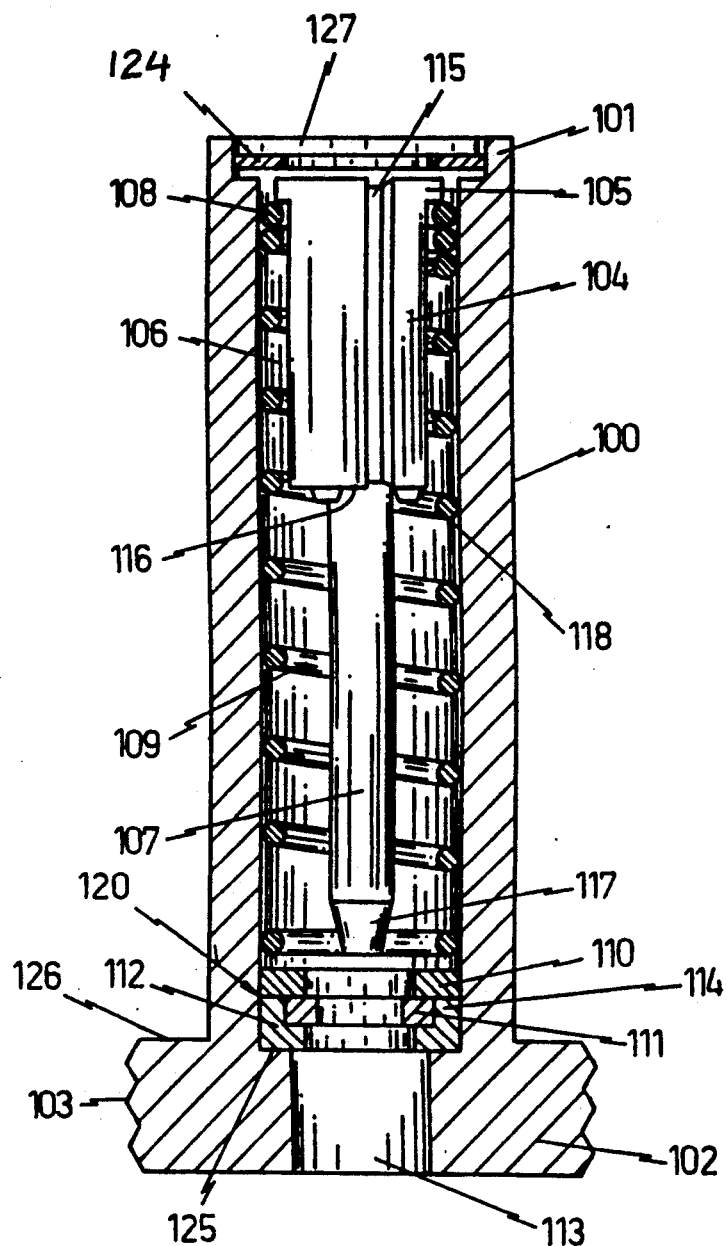
FIG. 1 is a longitudinal cross-sectional view of a device for saving or limiting the rate of flow of fluids, built in accordance with the present invention, and showing the improvements in the flow regulating washer assembly thereof.

Referring now to FIG. 1 of the drawings, there is shown a fluids rate of flow saver or limiting device built according to the present invention, particularly designed to provide the minimization of noise and rattling, as well as for preventing blocking of the passage by dislodgement of the soft washer of a flow regulating washer assembly when used in high pressure systems. Said device comprises a connecting tube or tubular fitting 100 having an inlet end 101 and an outlet end 102 provided with an outer thread 103, this end 102 being of an outer diameter larger than that of the remainder of the fitting body and of an inner diameter smaller than that of the remainder of the fitting body. Within said tubular fitting 100 there is a stepped, cylindrical needle type shutter 104, comprising an upper part or inlet portion 106 provided with a larger diameter and having at its upper end a circumferential flange 105, said upper or inlet portion 106 being an upper elongated cylindrical body with a diameter smaller than that of the upper flange 105, and a lower or needle body portion 107 having a diameter smaller than that of the upper portion 106, and a length larger than that of the said upper portion 106, said lower portion 107 being provided with a lower needle shaped end 117.

Around the upper end of the cylindrical body portion 106, and bearing on the lower surface of the flange 105, an O-ring 108 having an outer diameter slightly larger than that of the flange 105 is provided. Below said O-ring 108, and directly bearing on the lower surface thereof, a spring 109 concentrically surrounding the needle type shutter 104 is provided. Said spring 109 is of a shape and a strength suitable to allow compression thereof under the fluid pressure, and recovery of its original position when the fluid pressure is removed, and is firmly supported at its other end on a flow regulating washer assembly comprising a washer 111 of soft material such as an elastomeric or plastics material, having an inner diameter approximately equal to the diameter of the needle portion 107 of the shutter and housed in a housing 120 of rigid material, provided with a bottom 112 having a central orifice of an inner diameter larger than that of the washer 111, a cylindrical wall 114 projecting upwardly of the bottom 112, and a lid 110 having a central orifice of an inner diameter equal to that of the bottom 112. The depth of the housing 120 is the same as the thickness of the washer 111, so that the lid 110 bears on the edge of the cylindrical wall 112 as well as on the soft washer 111. This washer assembly is firmly supported on a shoulder 125, internally formed in the tubular fitting 100 by a reduction of the diameter thereof.

The rigid lid 110 and the bottom 112 of the housing 120 practically sandwiching said soft washer 111, prevent the latter from being dislodged and carried away by high pressure flow towards and into the outlet 113 of the end 102 of the tubular fitting 100 and thus prevent the possibility of causing the blocking of said fitting.

At the upper end of the tubular fitting 100, above the needle type shutter 104, there is arranged a washer of rigid material, generally designated with the reference numeral 124, acting as a stop or stroke limiter for the shutter 104 at the inlet end of the tubular fitting 100. Said rigid washer 124 is preferably pressure fitted within a cylindrical cavity 127 formed at the inlet end 101 of the tubular fitting 100.

In the cylindrical body portion 106 of the shutter 104, one or more longitudinally extending surface grooves 115 are formed, through which grooves the fluid passes without the risk of easily clogging such grooves with the impurities or sediments of the fluids, such as in hard waters.

A circumferential tapering or chamfer is formed in the shoulder or step 116 constituted by the reduction in diameter between the body portion 106 and the needle portion 107 of the shutter 104, and on said tapering or chamfer 116, several projections 118 of short length are provided, so that when the shutter body portion 106 rests on the rigid lid 110 of housing 120, after being pushed by the inflow of high pressure fluid, a plurality of slots or windows will be formed between the shoulder 116 and the lid 110 for allowing the passage of fluid, inasmuch as said projections 118 will abut against lid 110 leaving a gap between said lid 110 and the shoulder 116 as mentioned above.

The fluids saving device of the present invention is highly useful for regulating the water flow in showers or the like, in which instance the external threads 103 of the outlet end 102 of the device are threadably introduced into the inner threads of a shower head (not shown) to an extent sufficient to leave a portion of said shower head threads free. Then the assembly is slidably introduced into the end pipe of a water line (not shown) and the external thread of said pipe is threadably introduced into the free threads of the shower head until the shoulder 126 of the tubular fitting 100 abuts against the edge of the pipe, whereby the device will be fully hidden by said pipe and by the threaded portion of the shower head and at the same type an hermetic engagement therebetween will be secured to provide an efficient performance of the device.

The shutter of the present invention, functions in such a way as to avoid the annoying noise of the prior art shutters and, besides, is not easily clogged because the surface grooves 115 formed around the body portion 106, provide a better fluid passage than the usual prior art holes or orifices. When a fluid passes through the fitting 100, said fluid enters through the inlet end 101, and then passes through the longitudinal surface grooves 115 formed on the cylindrical body portion 106 of the shutter 104, and pushes the shutter 104 towards the outlet end 102 of said tubular fitting 100, in such a way that the needle-shaped end 117 of the needle portion 107 passes through the opening of the lid 110, the soft washer 111 and the bottom 112 of housing 120 because of the compression suffered by the spring 109 due to the fluid pressure. The motion of the fluid produces vibrations in the needle body 107, such that the O-ring 108 and the needle-shaped end 117, strike laterally, respectively, against the inner wall of the fitting 100 and against the interior of the washer 111, which is of an internal diameter smaller than that of the lid 110 and of the orifice of the bottom 112 of the housing 120, thus dampening the noise, because said 0-ring 108 and said washer 111 are made of a soft material of the elastomeric or plastics type.

On the other hand, when the fluid flow is cut or reduced so that the pressure exerted on the spring 109 decreases, this spring pushes the shutter 104 actuating on the flange 105 and the washer 124 stops the movement of the shutter when the upper part of said flange 105 hits against the washer 124, which action is effected at a gradual rate depending on the rate of fluid flow interruption.

Furthermore, when a high pressure fluid passes through the tubular fitting 100, the spring 109 is compressed to an extent sufficient to bring the projections 118 formed on the shoulder 116 of the shutter 104 to abut against the lid 110 of housing 120, said lid being a hard washer that does not allow such projections 118 to penetrate the same, whereby a plurality of slots or windows remain between each pair of the projections 118, for allowing a restricted flow of the fluid.

Finally, when said high pressure fluid is flowing, the lid 110 and the housing 120 behave as a retainer for the soft washer 111, which is sandwiched between lid 110 and the bottom 112 of housing 120 and enclosed within the same, so that said soft washer 111 is prevented from being dislodged and carried away to the lower opening 113 of the outlet end 102, thus avoiding the blocking of said outlet opening 113 by said dislodged washer 111.

Figure 2:
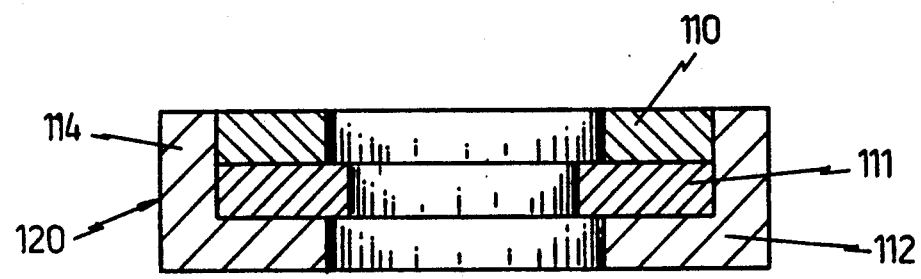
FIG. 2 is a cross-sectional view showing an additional embodiment of the flow regulating washer assembly of the invention.

FIG. 2 shows an additional embodiment constituted by the soft washer 111 and the housing 120. The soft washer 111 in this embodiment is supplied on the bottom 112 of the housing 120, which housing has a cylindrical wall 114 that extends perpendicularly of said bottom 112 to a distance sufficient to provide a depth equivalent to the combined thicknesses of the soft washer 111 and the lid 110, with the latter having an outer diameter suitable for being received within the cylindrical wall 114 and rest upOn the soft washer 111, with its upper surface approximately flush with the upper edge of wall 114.

By means of the above arrangement of parts, it is possible to compensate for variations in the thickness of the elastomeric or plastics material constituting the soft washer 111, since the lid 110 may be introduced into the cylindrical space formed by said cylindrical wall 114 a sufficient distance to suitably press said soft washer against the bottom 112 of housing 120.

As a preferred embodiment of the invention, the soft washer 111 is fixed within housing 120 by means of a suitable adhesive or the like and the lid 110 is thereafter soldered or otherwise fixed to the cylindrical wall 114 to provide a fully replaceable unit.

Although certain specific embodiments of the present invention have been shown and described, it is to be understood that many modifications thereof are possible. The invention, therefore, is not to be restricted except insofar as is necessitated by the prior art and by the spirit of the accompanying claims.

What is claimed is:

1. In a fluids rate of flow saving or limiting device which comprises a tubular fitting having an inlet end and an outlet end, said inlet end having a slightly larger inner diameter than said tubular fitting, to form a first shoulder between said inlet end and said tubular fitting, a rigid washer fixed on said first shoulder to serve as a shutter stop, said outlet end having a larger outer diameter than said tubular fitting and being provided with external threads and a smaller inner diameter to form a second shoulder between said tubular fitting and said outlet end; a needle type shutter comprising an upper cylindrical body portion having a radially outwardly extending flange on the top thereof, and a lower cylindrical body portion having a needle shaped end at the bottom thereof, said lower cylindrical body portion being of a diameter smaller than said upper cylindrical body portion to form a third shoulder therebetween, and a spring having its upper end bearing against an O-ring of soft material inserted between said spring and the flange of the shutter to dampen the strike of said spring against said flange, and its lower end bearing on a flow restricting washer assembly supported on said second shoulder; a plurality of projections on said third shoulder adapted to abut against the surface of said flow restricting washer assembly when the shutter is pushed by the fluid downwardly so as to provide a corresponding plurality of slots between each pair of said projections for allowing the passage of said fluid therethrough at a restricted flow rate; and at least one surface groove longitudinally provided on the surface of said upper cylindrical body portion of the shutter and extending the full length thereof to provide a free non-clogging passage for the fluid from said inlet end through said shutter to said outlet end of said tubular fitting, the improvement which comprises a flow restricting washer assembly supported on said second shoulder and comprising a soft washer of an elastomeric or plastics material, having an opening with a diameter suitable to permit the free passage therethrough of said lower body portion of said shutter, said soft washer being housed within a housing of rigid material having a bottom provided with an orifice of a diameter smaller than the diameter of said soft washer, a cylindrical wall extending upwardly of said bottom to a distance sufficient to constitute a cavity for receiving therewithin said soft washer and a lid to cover said cavity and having an orifice to the same diameter as said bottom, whereby said soft washer will be sandwiched and fixed between said lid and said bottom of said housing and will project radially inwardly of said rigid lid and said bottom of said housing to a distance sufficient to dampen a rattling action of said shutter against the inner walls of said housing, said soft washer being fixed within said housing such that dislodgement thereof by high pressure fluid is avoided.

2. A device as claimed in claim 1 wherein said housing for housing said soft washer comprises a bottom, a cylindrical wall extending upwardly along the periphery of said bottom to an extent sufficient to span the thickness of said soft washer, and a lid supported on the upper edge of said cylindrical wall to house said soft washer between said bottom and said lid.

3. A device as claimed in claim 1 wherein said housing for housing said soft washer comprises a bottom, a cylindrical wall extending upwardly along the periphery of said bottom to an extent sufficient to span the combined thicknesses of said soft washer and said lid, said lid being of a diameter suitable to be received within the cavity formed by said cylindrical wall to rest over said soft washer so as to press-sandwich said soft washer against said bottom.

4. A device as claimed in claim 2 wherein said soft washer is fixed within said housing by an adhesive and said lid is soldered to the upper edge of said cylindrical wall.

5. A device as claimed in claim 3 wherein said soft washer is fixed within said housing by an adhesive and said lid is soldered to the inner surface of said cylindrical wall.

* * * * *